(12) United States Patent
Gupta et al.

(10) Patent No.: US 11,481,029 B2
(45) Date of Patent: Oct. 25, 2022

(54) METHOD FOR TRACKING HAND POSE AND ELECTRONIC DEVICE THEREOF

(71) Applicant: Samsung Electronics Co., Ltd., Suwon-si (KR)

(72) Inventors: Gaurav Gupta, Bangalore (IN); Arindam Mondal, Bangalore (IN); Prash Goel, Bangalore (IN); Aloknath De, Bangalore (IN); Christopher Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/272,226

(22) Filed: Feb. 11, 2019

(65) Prior Publication Data

US 2019/0250708 A1 Aug. 15, 2019

(30) Foreign Application Priority Data

Feb. 9, 2018 (IN) .............................. 201841005033
Dec. 4, 2018 (IN) .............................. 201841005033

(51) Int. Cl.
*G06F 3/01* (2006.01)
*G02B 27/01* (2006.01)
*G06T 19/00* (2011.01)

(52) U.S. Cl.
CPC ........... *G06F 3/014* (2013.01); *G02B 27/017* (2013.01); *G02B 27/0179* (2013.01); *G06F 3/017* (2013.01); *G06T 19/006* (2013.01); *G02B 2027/0187* (2013.01)

(58) Field of Classification Search
CPC ........ G06F 3/017; G06F 3/0346; G06F 3/014; G06T 19/006; G02B 27/017; G02B 27/0179; G02B 2027/0187
See application file for complete search history.

(56) References Cited

U.S. PATENT DOCUMENTS

| 7,812,815 | B2 | 10/2010 | Banerjee et al. |
| 9,799,144 | B2 | 10/2017 | Kimura et al. |
| 2009/0033623 | A1 | 2/2009 | Lin |
| 2010/0063794 | A1 | 3/2010 | Hernandez-Rebollar |
| 2014/0098018 | A1 | 4/2014 | Kim et al. |
| 2015/0258431 | A1 | 9/2015 | Stafford et al. |

(Continued)

FOREIGN PATENT DOCUMENTS

| JP | 2008-70319 A | 3/2008 |
| JP | 2015-188175 A | 10/2015 |

(Continued)

OTHER PUBLICATIONS

International Search Report dated May 7, 2019, issued in the International Application No. PCT/KR2019/001630.

(Continued)

*Primary Examiner* — Yaron Cohen
(74) *Attorney, Agent, or Firm* — Jefferson IP Law, LLP

(57) ABSTRACT

A method for hand pose tracking in a virtual reality (VR) environment by a wearable device is provided. The method includes calibrating a plurality of sensors configured to detect an orientation of fingers with respect to a hand of a user, identifying sensor data obtained by the plurality of sensors, and tracking a pose of the hand based on the sensor data.

20 Claims, 17 Drawing Sheets

After calibration

(56) References Cited

U.S. PATENT DOCUMENTS

| | | |
|---|---|---|
| 2015/0358614 A1 | 12/2015 | Jin |
| 2016/0054798 A1* | 2/2016 | Messingher ........ G02B 27/0093 |
| | | 345/156 |
| 2016/0350973 A1 | 12/2016 | Shapira et al. |
| 2016/0378176 A1 | 12/2016 | Shiu et al. |
| 2017/0156662 A1* | 6/2017 | Goodall ............... A61B 5/0036 |
| 2017/0178272 A1 | 6/2017 | Lashkari et al. |
| 2017/0255261 A1 | 9/2017 | Huang et al. |
| 2017/0262056 A1 | 9/2017 | Osman |
| 2018/0299947 A1* | 10/2018 | Chang .................... A63F 13/25 |

FOREIGN PATENT DOCUMENTS

| | | |
|---|---|---|
| KR | 10-2018-0000768 A | 1/2018 |
| WO | 2016/189372 A2 | 12/2016 |
| WO | 2017112228 A1 | 6/2017 |

OTHER PUBLICATIONS

Ndian Office Action dated Oct. 6, 2020; Indian Appln. No. 201841005033.

Gomez et al.; Integration of the Rutgers Master II in a Virtual Reality Simulation; IEEE; XP 000529986; Nov. 3, 1995; pp. 198-202.

European Search Report dated Jan. 13, 2021; European Appln. No. 19750422.8-1216 / 3707584 PCT/KR2019001630.

\* cited by examiner

METHOD FOR TRACKING HAND POSE AND ELECTRONIC DEVICE THEREOF

CROSS-REFERENCE TO RELATED APPLICATION(S)

This application is based on and claims priority under 35 U.S.C. § 119(a) of an Indian patent application number 201841005033, filed on Feb. 9, 2018, in the Indian Patent Office, and of an Indian patent application number 201841005033, filed on Dec. 4, 2018, in the Indian Patent Office, the disclosure of each of which is incorporated by reference herein in its entirety.

BACKGROUND

1. Field

The disclosure relates to a wearable device. More particularly, the disclosure relates to the wearable device and method for tracking a hand pose in a virtual reality (VR) environment.

2. Description of Related Art

In general, a VR environment is a simulated environment created and presented to a user through a VR device. When the user is to perform some interactions within the VR environment with the user's hands such as pulling, pushing, or holding something, the VR environment provides virtual hands. Further, the virtual hands are operated using handheld controllers such as buttons, joysticks, or touch pads for performing the interactions which does not provide an intuitive and realistic user experience. Further, the use of the handheld controllers lacks intuitiveness and seamlessness expected of VR devices.

In some VR systems of the related art, the virtual hands are used in the VR environment along with a hand tracking system to track a pose, a motion, and a position of the user's hands. However, the hand tracking systems use sensors which are often unable to accurately track a position of a user's fingers thereby causing poor representation of movement of the user's hand in the VR environment. Further, the wearable devices for hand tracking have limited functionality due to a number of the sensors and placement of the sensors. Further, the wearable device designed with sensors for a single user may not be able to track a hand pose of another user. Also, the wearable devices do not have a well-defined calibration technique due to fitment variability.

The above information is presented as background information only to assist with an understand of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wearable device and method for hand pose tracking in a virtual reality (VR) environment.

Another aspect of the disclosure is to receive orientation information of a plurality of sensors in the wearable device for a plurality of hand poses of a user.

Another aspect of the disclosure is to map the received orientation information of the plurality of sensors with a pre-determined orientation of hand poses of the user.

Another aspect of the disclosure is to dynamically track the hand pose in the VR environment based on the orientation information received from the plurality of sensors in the wearable device and one or more position tracking sensors in the VR device.

Another aspect of the disclosure is to track the hand pose of the user when the user's hand is outside a field of view of position tracking sensor of the VR device.

Additional aspects will be set forth in part in the description which follows and, in part, will be apparent from the description, or may be learned by practice of the presented embodiments.

In accordance with an aspect of the disclosure, a method for hand pose tracking in a VR environment by a wearable device is provided. The method includes receiving orientation information of a plurality of sensors in the wearable device for a plurality of hand poses of a user and mapping the received orientation information of the plurality of sensors with a pre-determined orientation of hand poses of the user. Further, the method also includes determining an absolute initial orientation of the wearable device with respect to a VR device. Furthermore, the method includes dynamically tracking the hand pose in the VR environment based on the orientation information received from the plurality of sensors in the wearable device and one or more position tracking sensors in the VR device.

In accordance with another aspect of the disclosure, a wearable device for hand pose tracking in a VR environment is provided. The wearable device includes a glove covering at least three fingers of a hand of a user and a plurality of sensors embedded on the glove. Further, the wearable device is powered by a battery and also includes one or more position tracking sensors. The wearable device is configured to receive orientation information of a plurality of sensors in the wearable device for a plurality of hand poses of the user and map the received orientation information of the plurality of sensors with a pre-determined orientation of hand poses of the user. Further, the wearable device is also configured to determine an absolute initial orientation of the wearable device with respect to a VR device and dynamically track the hand pose in the VR environment based on the orientation information received from the plurality of sensors in the wearable device and one or more position tracking sensors in the VR device.

In accordance with another aspect of the disclosure, a method for hand pose tracking in an interactive environment, by a wearable device of is provided. The method includes receiving orientation information of a plurality of sensors in the wearable device for a plurality of hand poses of a user and mapping the received orientation information of the plurality of sensors with a pre-determined orientation of hand poses of the user. The method also includes determining an absolute initial orientation of the wearable device with respect to an interactive electronic device and dynamically tracking the hand pose in the interactive environment based on the orientation information received from the plurality of sensors in the wearable device and information from one or more position tracking sensors in the interactive electronic device.

In accordance with another aspect of the disclosure, a method for operating an electronic device is provided. The method includes calibrating a plurality of sensors configured to detect an orientation of fingers with respect to a hand of a user, identifying sensor data obtained by the plurality of sensors, and tracking a pose of the hand based on the sensor data.

In accordance with another aspect of the disclosure, an electronic device is provided. The electronic device includes a display, a transceiver, and at least one processor electrically coupled with the transceiver and the display, and configured to calibrate a plurality of sensors configured to detect an orientation of fingers with respect to a hand of a user, identify sensor data obtained by the plurality of sensors, and track a pose of the hand based on the sensor data.

In accordance with another aspect of the disclosure, a wearable device for hand pose tracking in the VR environment is provided. The wearable device includes a glove covering at least part of a thumb, at least part of an index finger and at least part of a middle finger, a fixing member coupled to the glove, a plurality of sensors arranged on the glove and configured to detect orientations of the thumb, the index finger and the middle finger, and a processer located on the fixing member and configured to transmit sensor data obtained by the plurality of sensors.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
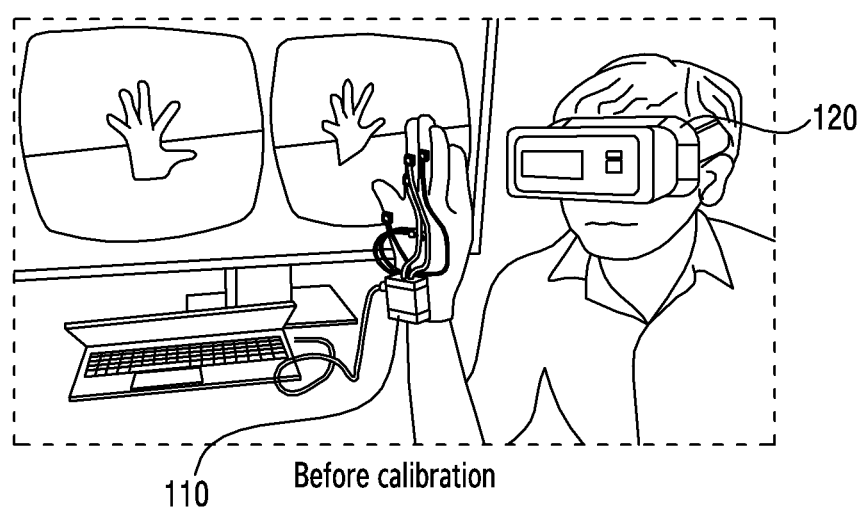
FIG. 1A illustrates an example illustrating hand pose tracking with respect to a virtual reality (VR) device, before calibrating a wearable device with respect to the VR device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. For example, a passage "at least one of a, b or c" may be understood as "only a", "only b", "only c", "both a and b", "both a and c", "both b and c", "all of a, b, and c", or variations thereof. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for hand pose tracking in a virtual reality (VR) environment by a wearable device. The method includes receiving orientation information of a plurality of sensors in the wearable device for a plurality of hand poses of a user and mapping the received orientation information of the plurality of sensors with a pre-determined orientation of hand poses of the user. Further, the method also includes determining an absolute initial orientation of the wearable device with respect to a VR device. Furthermore, the method includes dynamically tracking the hand pose in the VR environment based on the orientation information received from the plurality of sensors in the wearable device and one or more position tracking sensors in the VR device.

In an embodiment, determining the absolute initial orientation of the wearable device with respect to the VR device includes receiving relative orientation of the hand with respect to the VR device.

In an embodiment, a relative orientation of the hand of the user with respect to the VR device is determined using on at least one hand pose on the VR device from a set of pre-determined hand poses.

In an embodiment, the plurality of sensors is placed at predetermined locations on the wearable device to track the movement of the hand of the user with respect to the VR device.

In an embodiment, the plurality of sensors is calibrated with respect to the VR device based on a single or a sequence of the predefined hand poses of the user.

In an embodiment, mapping the received orientation information of the plurality of sensors with the pre-determined orientation of hand poses of the user includes determining an axis of rotation from a first hand pose to a second hand pose using the orientation information received from the plurality of sensors. Further, the method also includes determining a quaternion that minimizes difference between the axis of rotation with an associated virtual axis and mapping the quaternion for each finger for all degrees of movements of the fingers.

In an embodiment, the wearable device includes a transmitter, one or more processors and the plurality of sensors at pre-determined locations for dynamically tracking the hand pose in the VR environment.

In the methods and systems of the related art, a vision/ultrasound based method with a camera/transmitter mounted on the VR device is used to track the hand poses of the user. However, the vision based methods are limited by a field of view, accuracy to detect hand position and computational complexity. Unlike methods and systems of the related art, the proposed method uses the combination of the vision system and inertial sensor on the wearable to track the hand position when it is out of the field of view of the VR device.

In the wearable devices of the related art, resistive bend sensors are used to track bend of each finger of the user to determine the movement of the hand of the user. However, the bend sensors may detect movement about one axis. Therefore, the wearable device has two or more bend sensors at each finger joint to capture the two degrees of freedom, which makes the wearable device bulky and reduces the ease of use.

In the gaming environment of the related art, gaming consoles and wireless gamepads are used to interact with the gaming environment which can be cumbersome to the user. Further, the targeted interaction the user wishes to perform in the gaming environment may not be accurate. Unlike methods and systems of the related art, the proposed method uses various sensors on the wearable to track the hand position to perform the various interactions in the interactive environment.

Referring now to the drawings and more particularly to FIGS. 1A, 1B, 2, 3, 4, 5, 6A, 6B, 6C, 7, 8, 9, 10A, 10B, 11, 12, and 13, where similar reference characters denote corresponding features consistently throughout the figures, there are shown preferred embodiments.

Figure 1B:
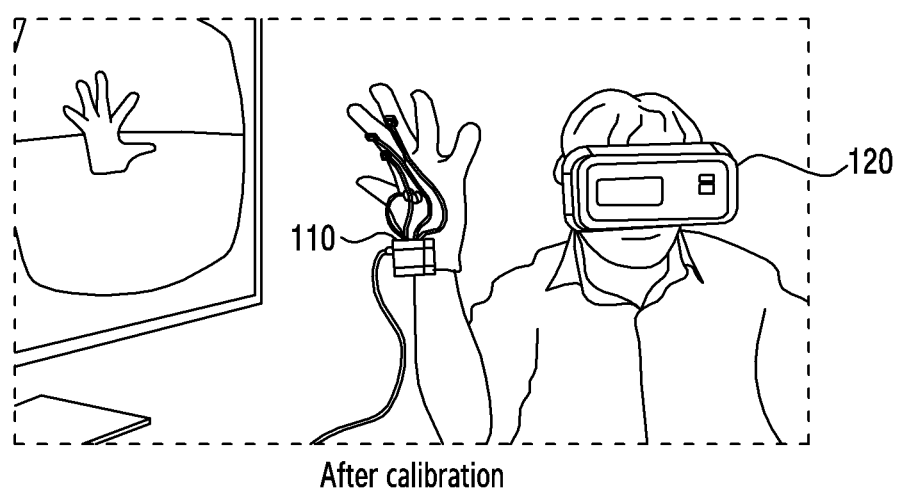
FIG. 1B illustrates an example illustrating hand pose tracking with respect to a VR device, after calibrating a wearable device with respect to the VR device according to an embodiment of the disclosure.

FIG. 1A illustrates an example illustrating hand pose tracking with respect to a VR device, before calibrating a wearable device with respect to the VR device according to an embodiment of the disclosure and FIG. 1B illustrates an example illustrating hand pose tracking with respect to a VR device, after calibrating a wearable device with respect to the VR device according to an embodiment of the disclosure.

Referring to FIGS. 1A and 1B, a wearable device 110 and a VR device 120 interact with each other. In other word, the wearable device 110 and the VR device 120 transmit and receive data for providing a VR service according to an embodiment of the disclosure. In an embodiment, the wearable device 110 may obtain and transmit sensor data to the VR device 120, and the VR device 120 may analysis the sensor data. In another embodiment, the wearable device 110 may obtain and analyze sensor data, and transmit a result of the analysis to the VR device 120. The VR device 120 may display VR contents based on received data or the result. To perform these operations, the wearable device 110 or the VR device 120 may include at least one of a transceiver, a processor, or a memory. Further, the wearable device 110 may include at least one sensor, and the VR device 120 may include a display. In the disclosure, the wearable device 110 or the VR device 120 may be referred as an 'electronic device'.

Consider that the wearable device 110 is not calibrated with respect to the fitment of the user. When the user holds the hand poses then the visualization of the hand poses in the VR environment will not be the same as that of the hand poses held by the user. For example, when the user holds a hand pose by holding the hand parallel to the VR device 120, the visualization of the hand poses in the VR environment may not be parallel to the VR device 120, as shown in FIG. 1A according to an embodiment of the disclosure.

The hand orientation in the VR environment is a function of sensors on the wearable device 110 and the VR device 120. Therefore, when the wearable device 110 is calibrated with respect to the user, the visualization of the hand poses held by the user will be correctly provided in the VR environment. When the user stretches all the fingers of the hand, the same visualization is provided in the VR environment, as shown in FIG. 1B according to an embodiment of the disclosure.

Figure 2:
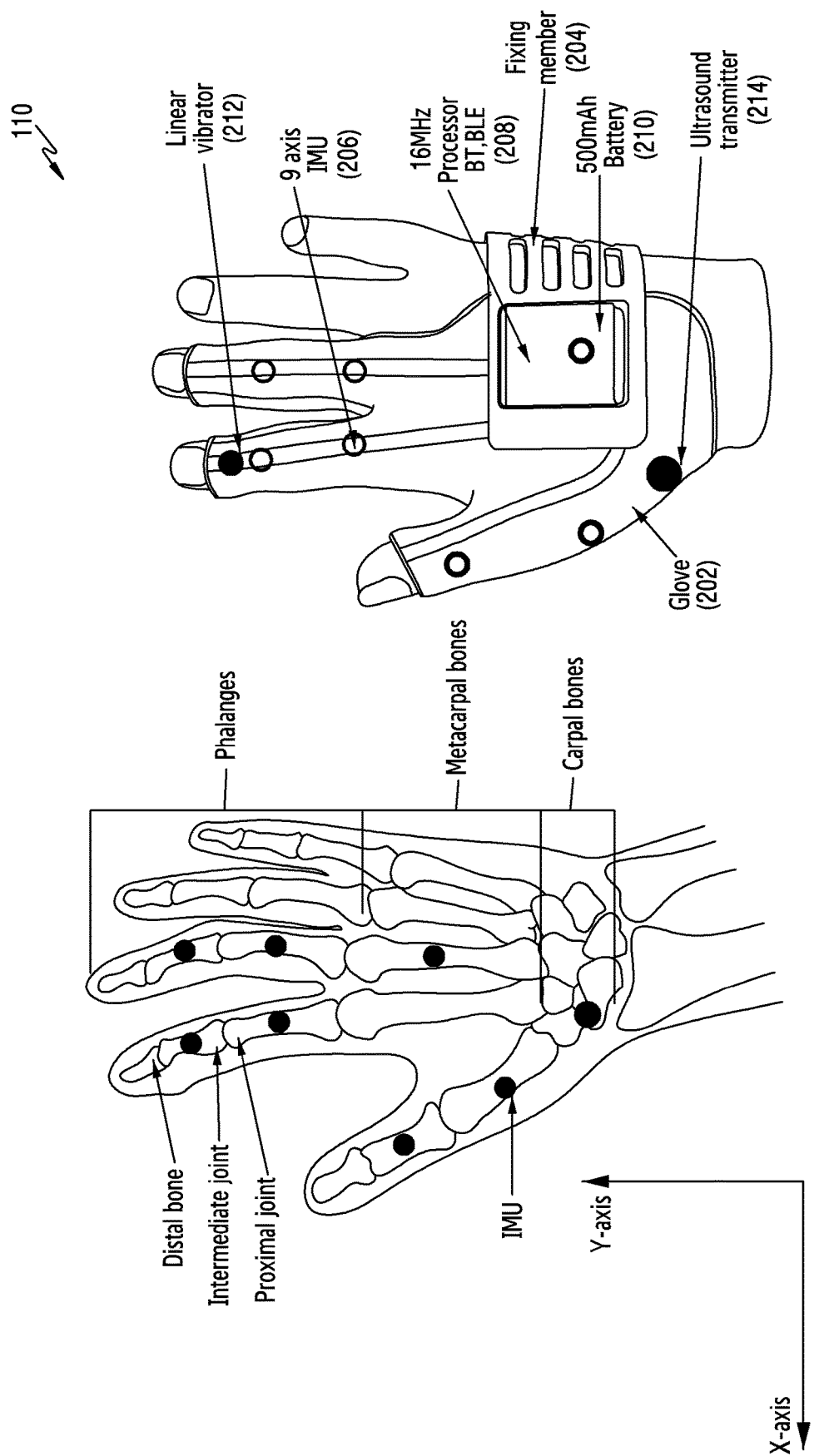
FIG. 2 illustrates the wearable device used for hand pose tracking in a VR environment according to an embodiment of the disclosure.

FIG. 2 illustrates the wearable device used for the hand pose tracking in the VR environment according to an embodiment of the disclosure.

Referring to FIG. 2, the wearable device 110 includes a glove 202 covering at least part of a thumb, at least part of an index finger and at least part of a middle finger, a fixing member 204 coupled to the glove 202, a plurality of sensors 206 arranged on the glove and configured to detect a movement of the thumb, the index finger and the middle finger, and a processer 208 located on the fixing member 204 and configured to transmit sensor data obtained by the plurality of sensors. Further, the wearable device 110 includes a battery 210 providing a power to the processor, at least one linear vibrator 212, and at least one an ultrasound transmitter 214.

In general, thumb, index and middle fingers of the hand have independent movement and also provide dexterity. Further, while holding various hand poses, a ring finger and a pinky finger tend to move as a function of the index finger and the middle finger. Furthermore, a proximal joint and an intermediate joint of the hand can represent most of the hand poses. A distal joint is fairly dependent on the rotation of the intermediate joint. Further, the position of the various joints is different for different hand sizes of various users. Hence, preferred positions of the sensors are different for different individual users. For example, the plurality of sensors 206 may include a first sensor arranged to detect an orientation of a middle phalanx of the thumb, a second sensor arranged to detect an orientation of a proximal phalanx of the thumb, a third sensor arranged to detect an orientation of a middle phalanx of the index finger, a fourth sensor arranged to detect an orientation of a proximal phalanx of the index finger, a fifth sensor arranged to detect an orientation of a middle phalanx of the middle finger, and a sixth sensor arranged to detect an orientation of a proximal phalanx of the middle finger.

The wearable device is designed to track the orientation of the proximal joints and intermediate joints of the index finger and the middle finger along with the metacarpal and the proximal joint of the thumb of the user. Therefore, the wearable device may cover three fingers of the hand of the user, as shown in FIG. 2. However, the orientation of the ring finger and the pinky finger are approximated and used for tracking orientation of the fingers of the user. Though, the wearable device can be extended to cover all the fingers of the hand of the user, the proposed method includes covering three fingers of the user's hand with sensors to provide ease of usage.

The wearable device 110 used for the hand pose tracking in the VR environment includes two major functions, for example, tracking a position with of the hand of the user respect to the VR device and tracking the orientation of the hand of the user. The orientation of the hand of the user and the orientation of the individual fingers is tracked using a set of inertial sensors 206 (e.g., inertial measurement unit (IMU) sensors) which are embedded in the wearable device 110. The IMU sensors include at least one of accelerometers, gyroscopes, or magnetometers. Further, the position of the hand of the user with respect to the VR device 120 is tracked by using an ultrasound sensing system. The wearable device 110 is provided with an ultrasound transmitter 214 and the VR device is provided with an ultrasound receiver. Therefore, based on the ultrasound waves received from the wearable device 110, the VR device 120 can track the position of the hand of the user. Further, the wearable device 110 is provided with a 16 MHz processor 208 which can provide connectivity using Bluetooth, Bluetooth low energy (BLE) and the like. The wearable device 110 also includes a battery 210 to power the sensors 206 used for tracking the various hand poses of the user. The wearable device 110 further includes the linear vibrator 212 generating vibration. For example, the linear vibrator 212 may generate the vibration according to actions in the VR environment.

Figure 3:
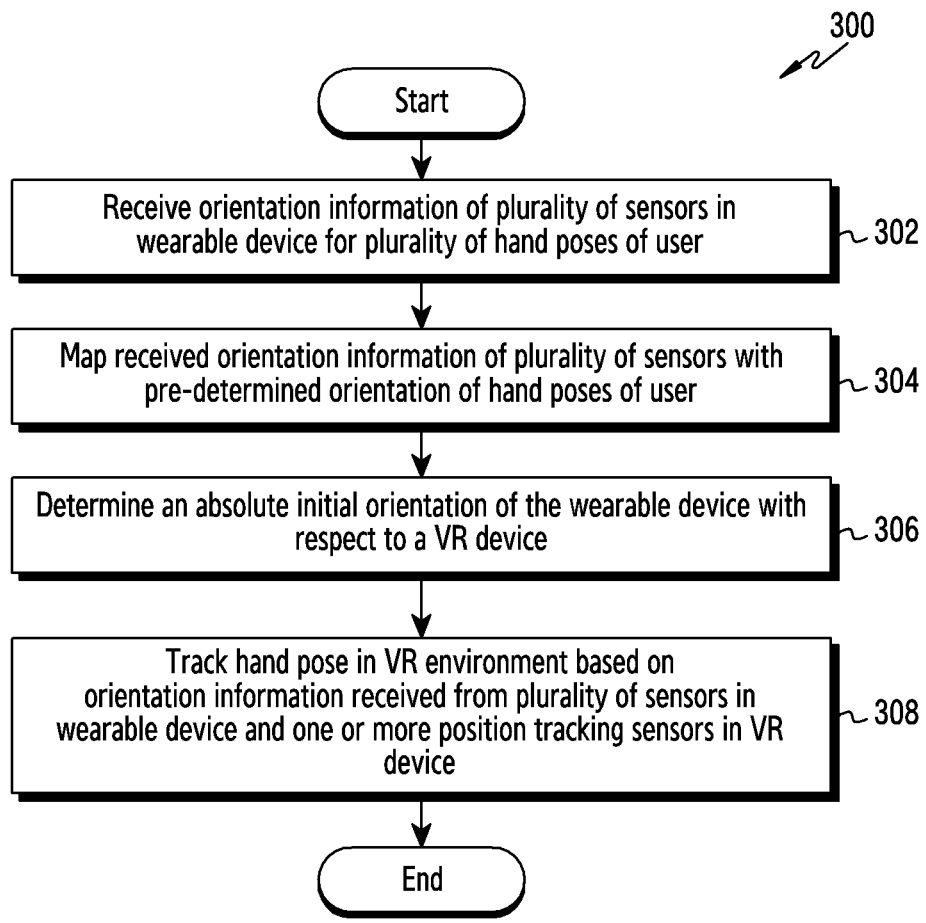
FIG. 3 is a flowchart illustrating a method for hand pose tracking in the VR environment by the wearable device according to an embodiment of the disclosure.

FIG. 3 is a flowchart 300 illustrating a method for hand pose tracking in the VR environment by the wearable device according to an embodiment of the disclosure. FIG. 3 exemplifies operations of the wearable device 110 according to an embodiment of the disclosure.

Referring to the FIG. 3, in operation 302, the wearable device receives the orientation information of the plurality of sensors for the plurality of hand poses of the user. The position of the various joints in the hand is different for different users. Hence, the position of the sensors in the wearable device is different for different users which provide different orientation to the plurality of sensors. Herein, the orientation information refers to the orientation of a sensor with respect to a reference frame. For example, an earth co-ordinate is used as the reference frame.

In operation 304, the wearable device maps the received orientation information of the plurality of sensors with the pre-determined orientation of the hand poses of the user. In operation 306, the wearable device determines the absolute initial orientation with respect to the VR device. The absolute initial orientation may be used to compute an relative orientation with respect to the VR device. In operation 308, the wearable device tracks the hand poses in the VR environment based on the orientation information received from the plurality of sensors and the one or more position tracking sensors in the VR device. For example, the one or more position tracking sensor includes at least one ultrasound sensor.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

In an embodiment illustrated in FIG. 3, operations are performed by the wearable device. In another embodiment, at least one of the operations illustrated in FIG. 3 may be performed by the VR device. For example, the wearable device obtains sensor data by using sensors (e.g., the IMU sensors) and transmits the sensor data to the VR device. After then, the VR device may perform operations of operations 304, 306 and 308.

Figure 4:
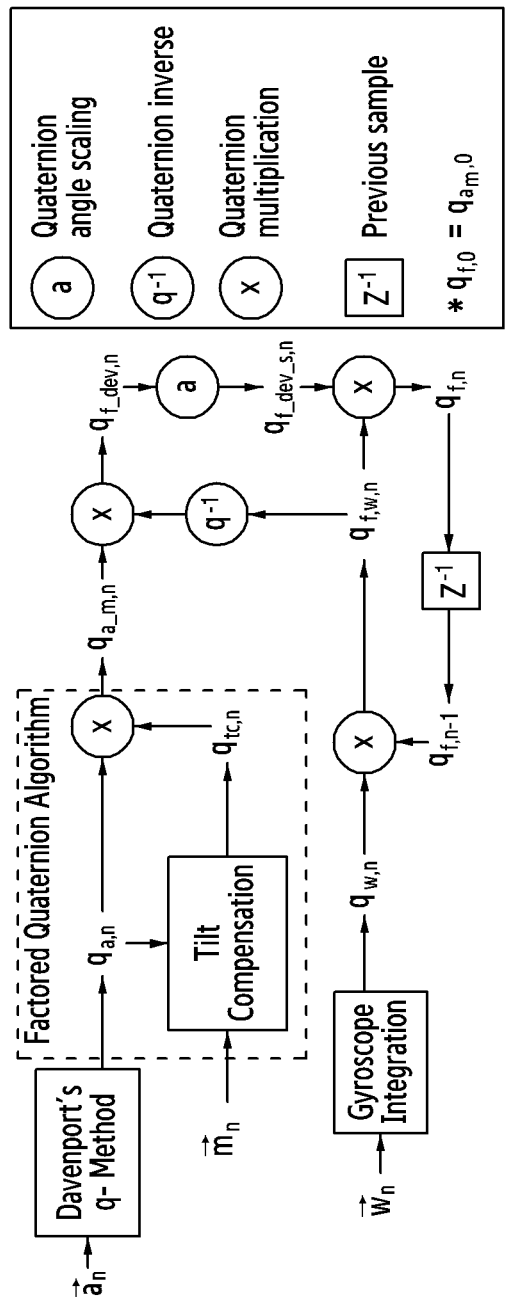
FIG. 4 illustrates a method for determining an orientation of the hand of the user based on a sensor data fusion technique according to an embodiment of the disclosure.

FIG. 4 illustrates a method for determining an orientation of the hand of the user based on a sensor data fusion technique according to an embodiment of the disclosure.

The wearable device includes the set of IMU sensors which are used for tracking the various movements of the hand and the individual fingers of the user. The IMU sensors include at least one of accelerometers, gyroscopes, or magnetometers. Referring to the FIG. 4, in the proposed method, a quaternion based complementary filter is used to determine the orientation of the hand of the user based on the results obtained from the accelerometer, the magnetometer and the gyroscope according to an embodiment of the disclosure. A quaternion is a four-element vector indicating a rotation in a 3 dimensional (3D) coordinate system. The quaternion is uniquely determined for each of hand poses. Therefore, a quaternion set including quaternion of a plurality of sensors may be used to detect the hand poses. The accelerometer data ($\vec{a}$) and magnetometer data ($\vec{m}$) is fused using a combination of Davenport's q-method and a Factored Quaternion method to get the absolute orientation of the sensors on the wearable device. Conventionally, the orientation computed from the Davenport's q-method is inconsistent due to the influence of inclination angle of the earth's magnetic field. The inconsistency is addressed by splitting the quaternion computation over two operations. The quaternion ($q_a$) is first computed from the accelerometer measurements using Davenport's q method:

$$\text{Accelerometer measurements, } \vec{a}=\{a_x,a_y,a_z\} \quad \text{Equation 1}$$

$$\text{Magnetometer measurements, } \vec{m}=\{m_x,m_y,m_z\} \quad \text{Equation 2}$$

where $q_a$ is derived by applying Davenport's q-method on $\vec{a}$.

The quaternion is used to tilt compensate the magnetometer reading, which then $\vec{m}_{tc}$ gives the heading quaternion.

$$\vec{m}_{tc}=q_a\times\vec{m}\times q_a^{-1} \quad \text{Equation 3}$$

Where × is quaternion multiplication.

$$\text{If } \vec{m}_{tc}=\{h_x,h_y,h_z\} \quad \text{Equation 4}$$

$$\text{Then } \emptyset=\tan^{-1}(h_y/h_x) \quad \text{Equation 5}$$

where, $h_x$ represents the magnetic field along x-axis and $\emptyset$ is the in-plane angle from earth's magnetic north.

$$q_{tc}=\{\cos(\emptyset/2),0,0,\sin(\emptyset/2)\} \quad \text{Equation 6}$$

The, $q_{tc}$ is the quaternion that represents the in-plane orientation from earth's magnetic north. The two quaternions combine to give the final orientation of the sensor ($q_{a\_m}$).

$$q_{a\_m}=q_{tc}\times q_a \quad \text{Equation 7}$$

The quaternion is unstable because of the noise in the sensor measurements. Further, this is fused with the gyroscope data ($\vec{w}$) using a quaternion based complementary filter as follows:

$$\text{Gyroscope measurements, } \vec{w}=\{w_x,w_y,w_z\} \quad \text{Equation 8}$$

$$q_w=\{\cos\theta/2, (\sin\theta/2*\theta_x/\theta), (\sin\theta/2*\theta_y/\theta),(\sin\theta/2*\theta_z/\theta)\} \quad \text{Equation 9}$$

where, $\theta_x=w_x dt$, and $\theta$ is the total magnitude of rotation and $q_w$ is the quaternion computed from the gyroscope. Let $q_f$ denote the fused quaternion between $q_{a\_m}$ and $q_w$. The initial value of fused quaternion ($q_{f,0}$) is computed using an accelerometer and a magnetometer, $$q_{f,0}=q_{a\_m,0} \quad \text{Equation 10}$$

At a given time n, the new orientation of the sensor using $q_{w,n}$ as $$q_{f\_w,n}=q_{f,n-1}\times q_{w,n} \quad \text{Equation 11}$$

The corresponding sensor orientation computed from the accelerometer and magnetometer is $q_{a\_m,n}$. Further, $q_{f\_dev,n}$ is computed which is the deviation in the quaternions $q_{f\_w,n}$ and $q_{a\_m,n}$.

$$q_{f\_dev,n}=q_{f\_w,n}^{-1}\times q_{a\_m,n} \quad \text{Equation 12}$$

This is a measure of the drift in the quaternion computed using the gyroscope alone. The fused quaternion is computed by taking a fraction of the above deviation and adding it to the quaternion from the gyroscope alone. Scaling of $q_{f\_dev}$ is done for the scalar component $(q_{f\_dev,n})_s$, which is the absolute angle of rotation.

$$q_{f\_dev\_s,n}=0.02*(q_{f\_dev,n})_s+(q_{f\_dev,n})_v \quad \text{Equation 13}$$

$$q_{f,n}=q_{f\_w,n}\times q_{f\_dev\_s,n} \quad \text{Equation 14}$$

The fused quaternion $q_f$ is the resulting orientation of the sensor at time n. The significance of the gyroscope has to be increased by lowering the value of the scaling parameter. As indicated in equations 10 and 11, the quaternion computed from the gyroscope is computed relative to an initial orientation $q_{a\_m,0}$. The accuracy of the initial orientation is pivotal for an accurate prediction of any subsequent orientation. The initial orientation is derived from the accelerometer and magnetometer readings which are known to be noisy. Further, an average is computed using some of the accelerometer and magnetometer measurements while the wearable device is stationary and then compute a stable $q_{a\_m,0}$ value.

A hierarchical representation of the hand of the user is used where the orientation of the intermediate finger joint is computed relative to the proximal joint $q_{int\_prox}$ and the proximal joint is computed with respect to the palm's orientation $q_{prox\_palm}$. This can be represented as follows:

$$q_{prox\_palm|s}=q_{palm|s}^{-1}\times q_{palm|s} \quad \text{Equation 15}$$

$$q_{int\_prox|s}=q_{prox|s}^{-1}\times q_{int|s} \quad \text{Equation 16}$$

The subscript S refers to the sensor's global coordinate system. When the wearable device is moved as a rigid body, the compensated quaternion ensures that the finger orientation with respect to the palm is maintained the same throughout. The accuracy of the sensor fusion algorithm can be inferred from the deviation in the compensated quaternion for a rigid body motion. As a VR application is viewed on the VR device, the wearable device's orientation is computed in the VR device reference coordinate system. The palm sensor's orientation is compensated relative to the orientation of the VR device. This gives the user a more realistic experience of the VR content as the hand model's orientation changes as the VR device is moved.

Another aspect for the representation of the user's hand in VR environment is to track the hand position either relative to an external reference or with respect to the VR device. The wearable device uses an inside out tracking approach, where a sensor mounted on the VR device tracks the relative position of the hands. For tracking the user's hand poses out of the field of view of the VR device, a fusion of ultrasound tracking system and inertial sensors is used. The ultrasound receiver is mounted on the VR device and the ultrasound transmitters are on the wearable device. An inertial sensor is placed near the transmitter to compute the position outside field of view (FoV). The FoV and accuracy of the position estimate is a function of the orientation of the ultrasound transmitter with respect to the ultrasound receiver. The ultrasound transmitter is placed on the back of the palm as shown in the FIG. 2.

The hand orientation and position are determined from the wearable device, which is determined in the sensor's coordinate system and has to be mapped to the virtual hand model's reference frame. The coordinate axis of the position measurement from the ultrasound receiver is aligned with the VR device and thereby the VR application. This therefore does not require axis mapping. The orientation of the sensors on the wearable device is determined in the VR device's reference frame. To determine the corresponding orientation in the virtual model a mapping quaternion (qmap) is computed. The mapping quaternion is computed for each sensor and its corresponding representation in the model. The hand model in the VR application is built in Unity and has a hierarchical structure for each joint. The orientation of the intermediate joint is with respect to the proximal joint ($q_{int\_prox}$), which in-turn is with respect to the orientation of the palm ($q_{prox\_palm}$).

$$q_{palm|M} = q^{-1}_{palm\_map} \times q_{palm|s} \times q_{palm\_map} \quad \text{Equation 17}$$

$$q_{palm|M} = q^{-1}_{prox\_map} \times q_{prox\_palm|s} \times q_{prox\_map} \quad \text{Equation 18}$$

Here, $q_{palm\_map}$ and $q_{prox\_map}$ represent the mapping quaternion of the palm and proximal bone and the subscript M refers to the coordinate system of the VR hand model. Additionally, $$q_{meta|M} = q_{palm|M} \times q_{meta\_palm|M} \quad \text{Equation 19}$$

$$q_{prox|M} = q_{meta|M} \times q_{prox\_meta|M} \quad \text{Equation 20}$$

$$q_{int|M} = q_{prox|M} \times q_{int\_prox|M} \quad \text{Equation 21}$$

Figure 5:
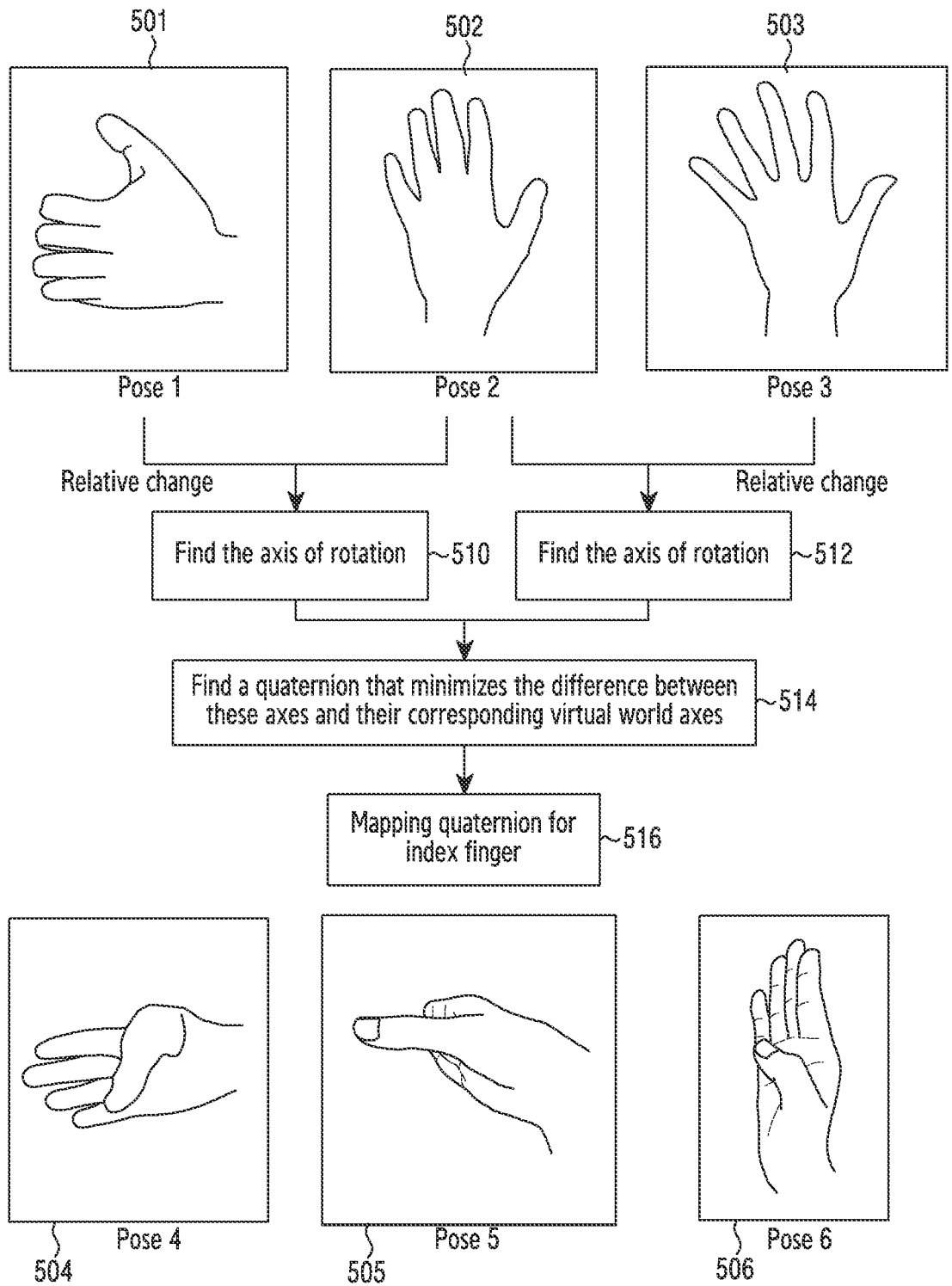
FIG. 5 illustrates the specific hand poses which are used to perform the user specific calibration of the wearable device according to an embodiment of the disclosure.

FIG. 5 illustrates the specific hand poses (though not limited to these alone) which are used to perform the user specific calibration of the wearable device, according to an embodiment of the disclosure.

The wearable device fits differently on different user's hands. Therefore, the orientation of each sensor on the wearable device has to be captured for each user before using the wearable device in the VR environment.

In order to determine the change in the hand poses of the hand of the user, the sensor data which have undergone a change due to the performance of the hand pose are chosen. In various embodiments, at least one pre-defined hand pose is used. Hand poses are defined based on at least one of a gap or an angle between fingers, an angle of each finger, bending of the fingers, a contact between fingers, or an angle of a hand. FIG. 5 illustrates examples of the hand poses 501-505.

Consider hand pose 501 and hand pose 502; and the hand pose 502 and hand pose 503, as shown in FIG. 5. In operation 510, the relative change from the hand pose 501 to the hand pose 502 is determined based on the change in the axis of rotation of the hand of the user. Further, in operation 512, the relative change from the hand pose 502 to the hand pose 503 is determined based on the change in the axis of rotation of the hand of the user. Further, in operation 514, a quaternion that minimizes the difference between the axes of rotations and their corresponding virtual world axes is determined. Then, in operation 516, the quaternion is mapped to the index finger of the user. That is, by the calibration, mapping relations between the quaternion and the hand pose is re-defined to optimize for a hand of the user.

Based on the equations 17 and 18 the mapping uses the quaternions to be known in the sensor frame and the corresponding model frame. As there are 3 unknowns in qmap, three hand poses are used for each joint. The hand poses would be performed by a new user wearing the wearable device during the calibration operation and the wearable device would be usable thereafter. A set of 6 hand poses 501-506 are used to map all the seven sensors of the wearable device, as shown in the FIG. 5. The hand poses are selected such that all the sensor quaternion measurements with minimal input from the user are captured. A single hand pose can be used to map multiple joints if there is an orientation change in the corresponding sensor.

Referring to the FIG. 5, hand pose 501 is used as the reference orientation for all sensors and the quaternion corresponding to every subsequent hand pose is computed relative to hand pose 501 according to an embodiment of the disclosure. Hand poses 503, 504 and 506 are used to map the palm sensor, hand pose 502 and hand pose 506 map the index and middle finger, and hand poses 502, 503 and 505 map the thumb. The index and middle finger may use only two hand poses for computation as these fingers have two degrees of freedom.

Alternately we also can map the orientation of all sensors on the device with the corresponding virtual frame using a single pose alone. We find a mapping quaternion is determined using a reference pose and the corresponding sensor orientation and orientation in the virtual model. In an embodiment, the VR device may display a guide for requesting to take the single pose and to place a hand wearing the wearable device on a predefined space. Then, the VR device may obtain at least one image of the hand, and calibrate the sensors. Herein, the at least one image can be obtained by using a camera or an infra red (IR) sensor. For example, the VR device calibrates the sensors by analyzing at least one image, identifying positions and orientations of the sensors, and defining rules (e.g., functions) for a conversion from measurement values of the sensors to a hand pose based on the positions and the orientations of the sensors. In another embodiment, another wearable device (e.g., a ring type device or bangle type device) may be used together with the wearable device.

For a given set of sensor and model quaternions, qmap is the effective rotation which when applied to the sensor orientation minimizes the error between the predicted and known model orientation. The vector component of the quaternion in the qmap computation is used as the same absolute rotation is used in computing the model's quaternion. The Davenport's q-method is used where the following function is minimized over q for all hand poses i.

$$L(q) = \Sigma_{i=2,3} (q^{-1} \times (q_{palm|s})_v \times q) - q_{palm|M} \quad \text{Equation 22}$$

$(q_{palm|s})_v$ is the vector component of the palm's orientation in the sensor coordinate system for each hand pose. The above example is for the palm sensor, but this is repeated for each sensor independently. The optimized value of q would be the mapping quaternion for that sensor. Once qmap is determined, any new sensor orientation can be mapped to the representations in the model (equations 17 and 18). The representation of the intermediate bone is much simpler as it has one degree-of-freedom. So the angle of bend (θ) computed from the sensor is directly mapped to the flexion axis in the virtual model.

$$\theta = \cos^{-1}((q_{int\_prox|S})_s) \quad \text{Equation 23}$$

$$q_{int\_prox|M} = \{\cos\theta, -\sin\theta, 0, 0\} \quad \text{Equation 24}$$

During the mapping of the index and middle fingers, the effective angle of rotation in hand pose 2 (abduction) is much smaller than hand pose 6 (flexion). The vector component of quaternion corresponding to each hand pose is an inverse function of the Sine of the angle of rotation. Smaller the angle, higher the variability in the computed vector which can further affect the qmap computation. The hand poses are weighted in Davenport's q-method such that the hand pose with the larger movement is weighed more. For the proximal joint of the index and middle finger, the weights to be 0.9 and 0.1 for flexion and abduction respectively are empirically determined. On calibrating the various sensors on the wearable device with respect to the hand of the user, the hand poses performed by the user can be accurately represented in the VR environment.

Figure 6A:
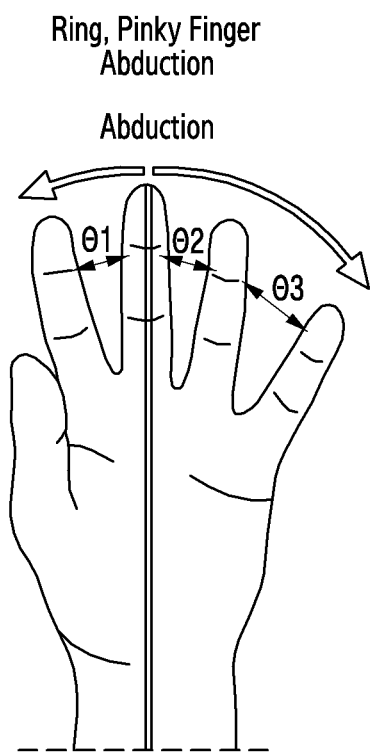
FIG. 6A illustrates a method for determining the approximate finger orientation for a ring finger and a pinky finger of the user's hand which is not covered by the wearable device according to an embodiment of the disclosure.
Figure 6B:
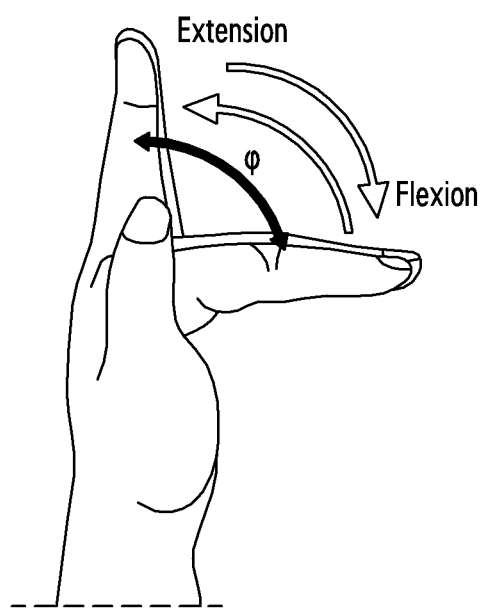
FIG. 6B illustrates a method for determining the approximate finger orientation for a ring finger and a pinky finger of the user's hand which is not covered by the wearable device according to an embodiment of the disclosure.
Figure 6C:
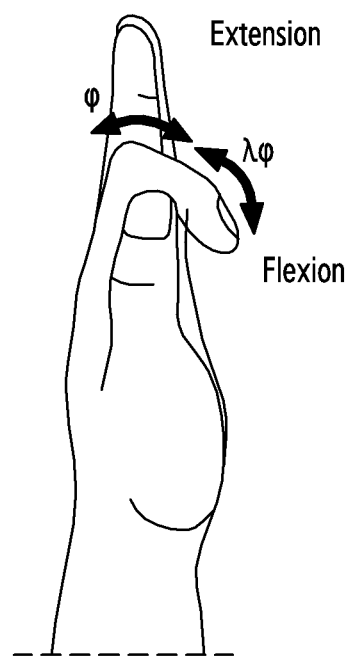
FIG. 6C illustrates a method for determining the approximate finger orientation for a ring finger and a pinky finger of the user's hand which is not covered by the wearable device according to an embodiment of the disclosure.

FIGS. 6A, 6B, and 6C illustrate a method for determining the approximate finger orientation for a ring finger and a pinky finger of the user's hand which is not covered by the wearable device according to an embodiment of the disclosure.

The ring and pinky finger orientation is approximated from the orientation of the index and middle finger as shown in FIGS. 6A and 6B. The wearable device tracks the orientation of three fingers i.e., the thumb, the index finger and the middle finger of the user's hand. However, the orientation of the ring and pinky fingers is determined based on the middle finger.

$$\Theta_2 = 0.75 * \Theta_1$$

$$\Theta_3 = 1.5 * \Theta_1$$

where $\Theta_1$ is the Euler angle about the rotation axis of abduction. The quaternion calculation is used to determine the orientation (abduction) of the ring and pinky finger. The bend of the proximal bone of the middle finger will be used to update the quaternion corresponding to the bend of the ring and pinky finger. The angle of bend is scaled by a factor of 1.1 to give it a realistic representation.

Further, the distal joint on each finger is approximated by the intermediate joint orientation as shown in FIG. 6C. The bend of the distal bone is approximated from the intermediate bone (a fraction of the intermediate bone bend). The mapping of the thumb is a little more involved as it has 3 degrees of freedom at the metacarpal joint. The sensor placed on the thumb's metacarpal bone measures very little change in orientation even at the extremities. As the measured change is small, its mapping to the virtual model is prone to have higher error. Alternatively, the relative orientation of the proximal bone with respect to the metacarpal bone and the proximal bone with respect to the palm is fairly large. These measurements are used to determine the orientation of the metacarpal bone in the model's coordinate system.

$$q_{meta\_palm|M} = q_{prox\_palm|M} \times (q_{prox\_palm|M} \times q_{meta\_prox|M}) \times q^{-1}_{prox\_palm|M} \qquad \text{Equation 25}$$

The wearable device does not have sensor on the ring and pinky fingers and their orientation is approximated from that of the middle and index finger. The flexion angle of the ring and pinky finger is obtained by scaling the flexion angle of the middle finger. The Euler angles are used about individual rotation axis $\in_{ring}$ and $(\in_{ring})_x$ as shown in FIG. 2.

$$(\in_{pinky|M})_Z = 0.75 * (\in_{middle\_index|M})_Z \qquad \text{Equation 26}$$

$$(\in_{pink|M})_x = 1.1 * (\in_{middle|M})_x \qquad \text{Equation 27}$$

Similarly, for the pinky finger, $$(\in_{pinky|M})_Z = 1.5 * (\in_{middle\_index|M})_Z \qquad \text{Equation 28}$$

$$(\in_{pinky|M})_x = 1.21 * (\in_{middle|M})_x \qquad \text{Equation 29}$$

Additionally, the maximum observable rotation of the ring and pinky finger from the initial reference orientation is limited based on empirical data. The limitation of the system is in scenarios when the ring and pinky finger are moved independently. After all the sensors are mapped to the corresponding joints in the hand model, any new hand pose of the hand can be recreated directly from the sensor data.

Figure 7:
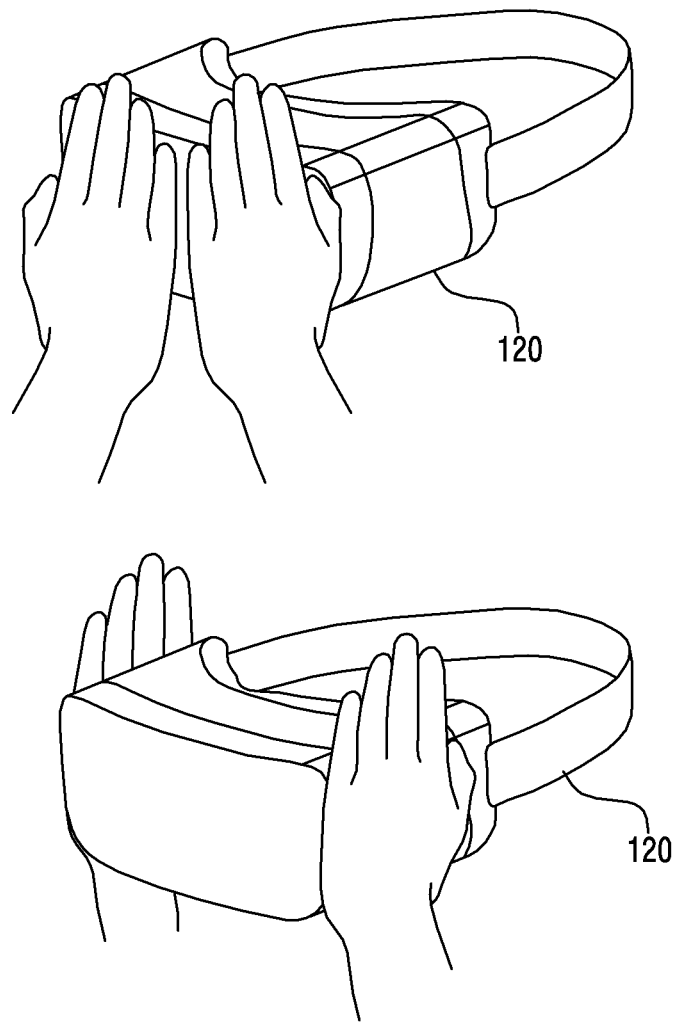
FIG. 7 illustrates an example for calibration of the wearable device with respect to the VR device according to an embodiment of the disclosure.

FIG. 7 illustrates an example for calibration of the wearable device with respect to the VR device according to an embodiment of the disclosure.

The user places both the hands on a flat surface of the VR device 120 such as one of a front portion of the VR device 120 and a side portion of the VR device 120, as shown in FIG. 7. On placing the hands on one of the front portion of the VR device 120 and the side portion of the VR device 120, a relative orientation between the hands of the user and the VR device 120 is determined. Further, the wearable device stores the relative orientation information which is used for all subsequent predictions of the orientation of the hand of the user.

In general, the fitment of the wearable for each user is different. Therefore, the position of the sensors on the wearable device and the orientation of the wearable device with respect to the VR device also vary for individual users. The proposed method includes performing calibration to determine the orientation of the sensors for each user for the accurate VR representation of the hand. Further, the axis of rotation of the sensor should be mapped to the axis of rotation of the VR device. The user is typically asked to perform specific hand poses. Further, the method includes detecting the user's hand pose and map accordingly. Initially, the user should perform a specific hand pose. In this example, the user is asked to perform abduction. The orientation of the sensor on each finger is determined relative to the sensor on the palm of the user's hand. The angle between every two fingers is determined and the relative quaternion is mapped to the virtual environment i.e., the angle between the index finger and thumb finger is mapped differently in the virtual environment for the two hand poses. Therefore, the proposed method ensures that the sensor orientations are accurately mapped.

Figure 8:
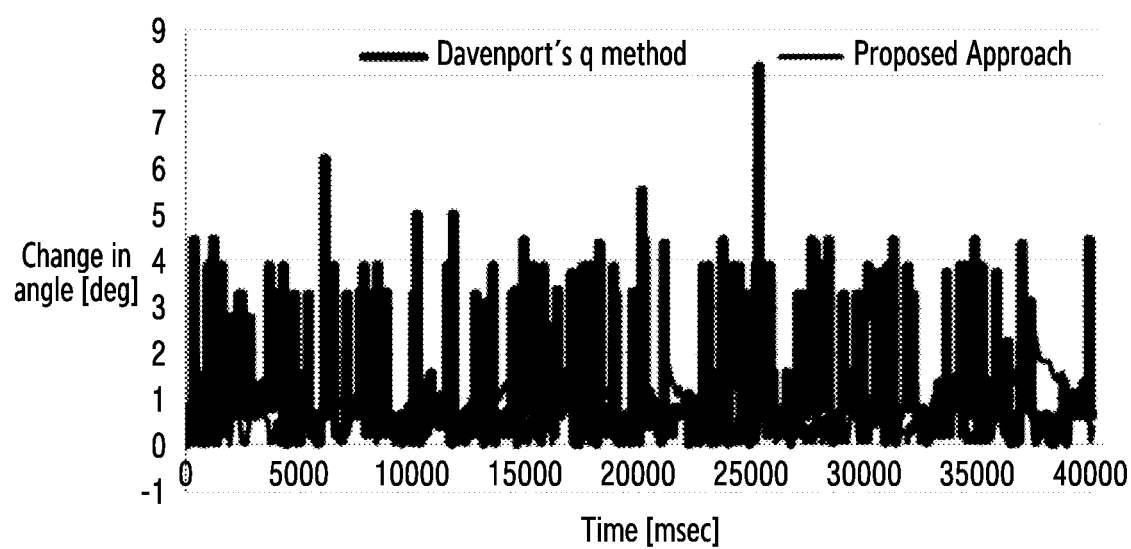
FIG. 8 illustrates a comparison of the sensor orientation computed from a Davenport's q-method and a sensor fusion method for orientation estimation according to an embodiment of the disclosure.

FIG. 8 illustrates a comparison of the sensor orientation computed from the Davenport's q-method and the sensor fusion method for estimating the orientation according to an embodiment of the disclosure.

The stability and accuracy of the proposed fusion method is determined based on two experiments. The sensor is kept stable and the fused quaternion is computed with respect to the initial quaternion to determine the stability of the proposed method. The FIG. 8 compares the predicted quaternion with that of the Davenport's q-method. Further, a significant improvement in the quaternion's stability is observed in the proposed method. The deviation in the proposed method is less than 3° and it is primarily due to the fluctuations in the magnetometer measurement.

Figure 9:
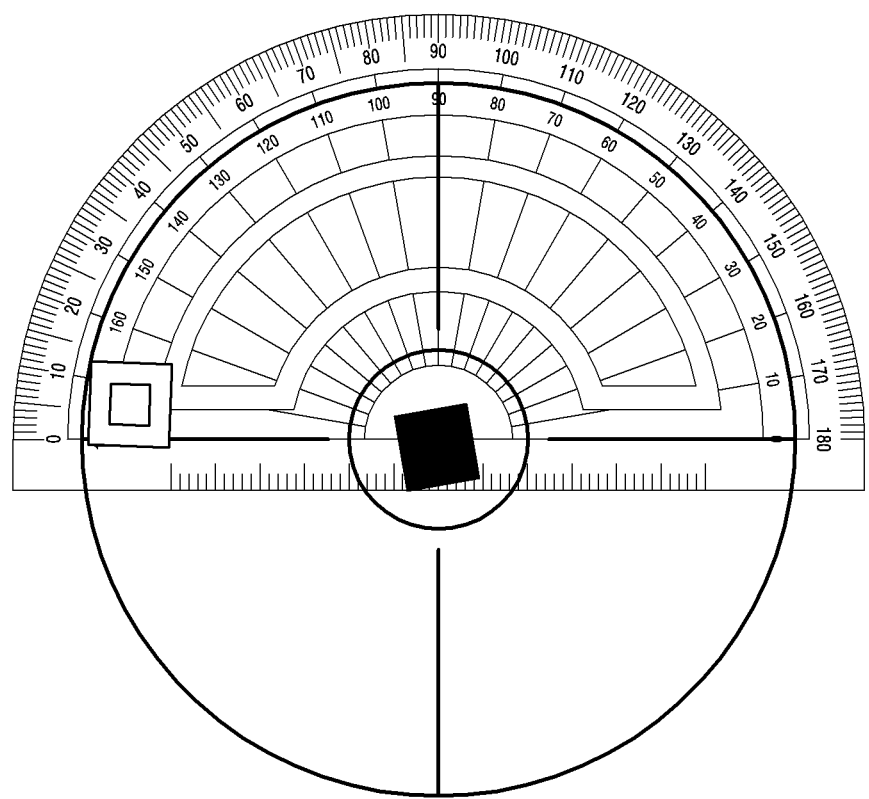
FIG. 9 illustrates an apparatus to determine an accuracy of the sensor fusion method for orientation estimation using a protractor as reference according to an embodiment of the disclosure.

FIG. 9 illustrates an apparatus to determine accuracy of the sensor fusion method for orientation estimation using a protractor as reference according to an embodiment of the disclosure.

The accuracy of the absolute orientation predicted by the fusion method by rotating the sensor about a known reference can be determined using the setup shown in FIG. 9 according to an embodiment of the disclosure.

$$q_{delta} = q_{initial}^{-1} \times q_{current} \qquad \text{Equation 30}$$

where is $q_{initial}$ the initial orientation, and $q_{current}$ is the current orientation. Therefore, $q_{delta}$ represents the quaternion to rotate the sensor to the current orientation in the initial reference frame.

Figure 10A:
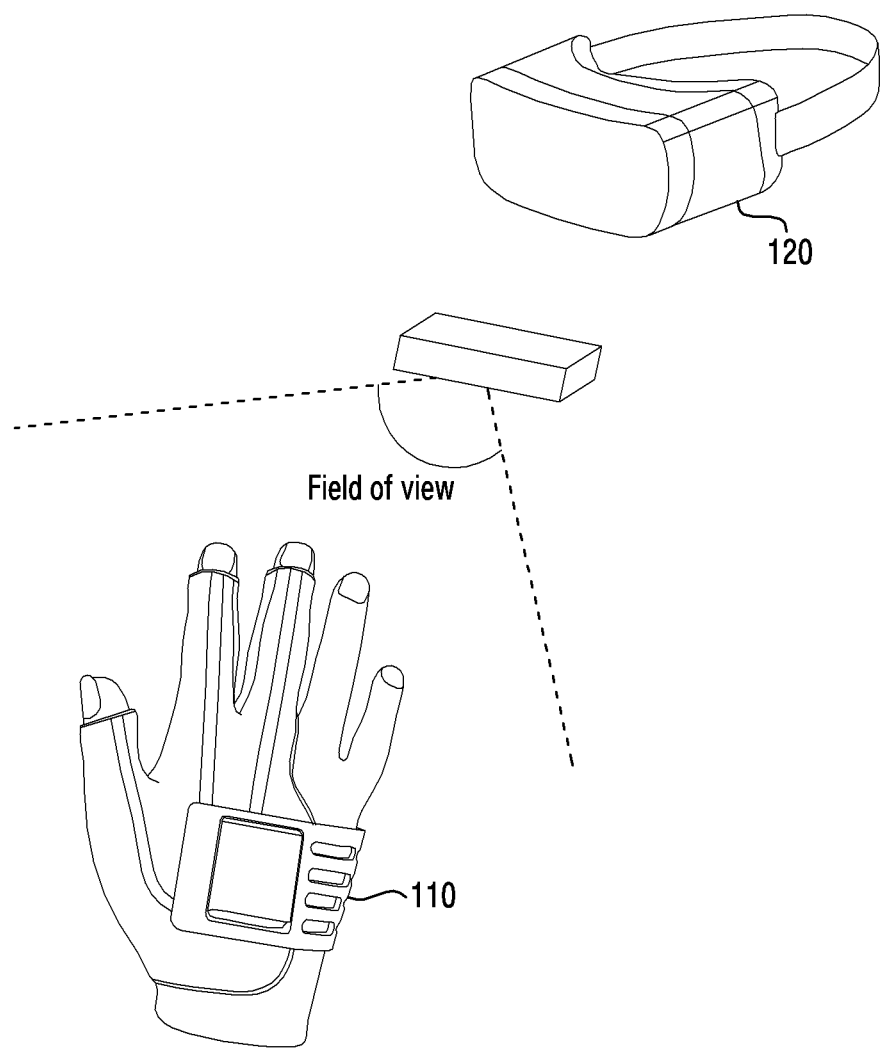
FIG. 10A illustrates hand pose tracking in the VR environment using a camera and an inertial measurement unit (IMU) sensor when a user's hand is within a field of view of the IMU sensor according to an embodiment of the disclosure.

FIG. 10A illustrates tracking the position of the user's hand with respect to the VR device, when the user's hand is within a field of view of the IMU sensor according to an embodiment of the disclosure.

In an embodiment, the camera/ultrasound sensor of the VR device 120 (i.e., an embedded camera or an associated camera accessory) can be used to track the position of the hand of the user with respect to the VR device 120. In addition to the inertial sensors on the wearable device, the camera is used to determine the position of the user's hand with respect to the VR device 120. Referring to the FIG. 10A, the user's hand is within the field of view of the camera and hence the position of the user's hand with respect to the VR device 120 can be tracked. Therefore, the hand poses performed by the user when the user's hand is within the field of view of the VR device 120 are accurately tracked and mapped in the VR environment.

Figure 10B:
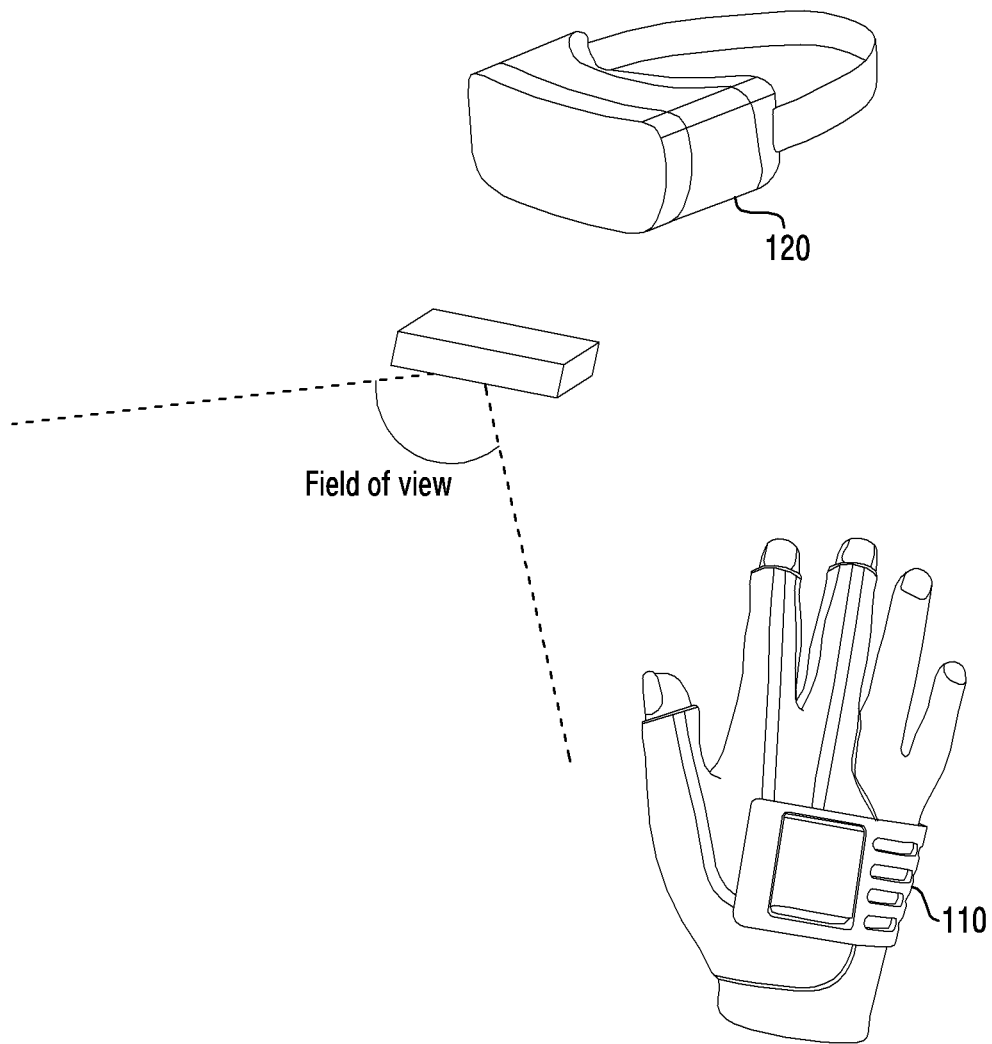
FIG. 10B illustrates hand pose tracking in the VR environment using the camera and the IMU sensor when the user's hand is out of the field of view of the IMU sensor according to an embodiment of the disclosure.

FIG. 10B illustrates hand pose tracking in the VR environment using the camera and the IMU sensor when the user's hand is out of the field of view of the IMU sensor, according to an embodiment of the disclosure.

Referring to the FIG. 10B, when the hand of the user is out of the field of view of the VR device, then the position of the user's hand with respect to the VR device 120 is tracked using the inertial sensor embedded in the wearable device 110. Therefore, the hand poses performed by the user when the user's hand is out of the field of view of the VR device 120 are accurately tracked and mapped in the VR environment based on the fusion of the camera/ultrasound sensor and the inertial sensor according to an embodiment of the disclosure.

Figure 11:
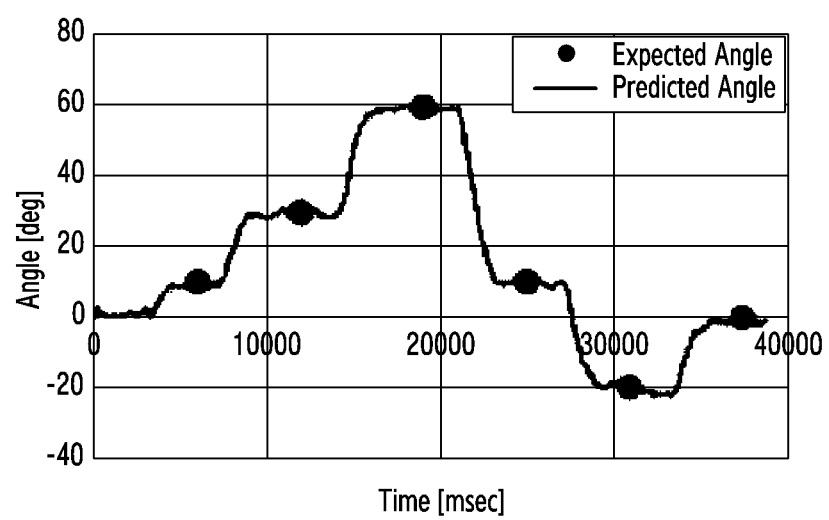
FIG. 11 illustrates a comparison of an expected angle of rotation and a predicted angle obtained by the sensor fusion method for orientation estimation according to an embodiment of the disclosure.

FIG. 11 illustrates a comparison of an expected angle of rotation and a predicted angle of rotation obtained by the sensor fusion method for orientation estimation, according to an embodiment of the disclosure.

Referring to the FIG. 11, a graph of an angle of rotation is plotted with respect to the time according to an embodiment of the disclosure. Further, the plot is obtained for the expected angle of rotation and the predicted angle of rotation of the hand of the user. The graph represents the absolute orientation obtained from the sensors on the wearable device, $2*\cos^{-1}((q_{delta}))_s$, the expected five angles of rotation from the protractor reading. The maximum deviation between the expected angle of rotation and the predicted angle of rotation of the hand of the user is less than 3°.

The wearable device used for tracking hand poses of the user in VR environment uses the compensated quaternion to determine the orientation of each finger joint. Further, the accuracy of the proposed compensated quaternion is quantified by mounting the sensors on a rigid body and moving the sensor and the rigid body together. The maximum observed deviation is 10° at some positions. However, the average deviation is 2.9°. The mapping quaternion is determined for each finger joint using the set of predetermined hand poses. Table 1 shows the error in the predicted orientation of the hand model for the palm and the index finger using the mapping quaternion and the corresponding target orientation. The coordinate system for the Euler angles is the same as shown in the FIG. 2 according to an embodiment of the disclosure. The motion is performed along two dominant axes independently so that the expected Euler angle can be measured using the protractor. The error in the predicted angle varies between less than a degree to at most 19.5°. In most axes the error is within 5-10°. The error increases with the angle of bend and the maximum percentage error is around 15-20% for small or large movements.

TABLE 1

| Sensor | Hand pose | Expected Euler Angle | | | Predicted Euler Angle | | |
|---|---|---|---|---|---|---|---|
| | | X | Y | Z | X | Y | Z |
| Palm | Flexion | −40 | 0 | 0 | −42.1 | −6.0 | −5.5 |
| | Flexion | −90 | 0 | 0 | −108.3 | −3.0 | −15.6 |
| | Radial deviation | 0 | 0 | 40 | −6.11 | 0.9 | 42.6 |
| | Radial deviation | 0 | 0 | −90 | −16.9 | −2.1 | −108.3 |
| Index Finger | Flexion | −40 | 0 | 0 | −35.2 | −1.3 | −1.8 |
| | Flexion | −90 | 0 | 0 | −109.5 | −2.25 | −1.6 |
| | Abduction | 0 | 0 | 40 | −6.3 | 1.1 | 31.9 |
| | Abduction | 0 | 0 | 90 | 1.6 | −2.2 | 109.5 |

The hardware design plays a critical role in the sensor measurement and the corresponding accuracy of the hand pose representation. It is essential that the inertial sensor mounted on the wearable device moves along with the finger and that there is no slip.

Figure 12:
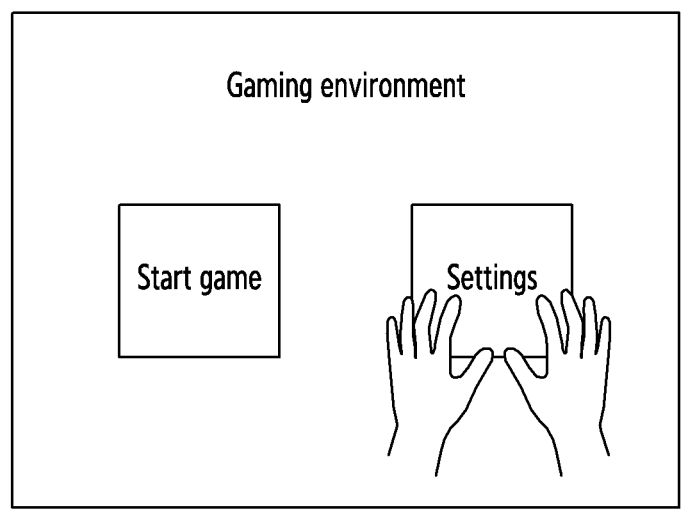
FIG. 12 illustrates an example scenario for determining an absolute orientation of the hand of the user according to an embodiment of the disclosure.

FIG. 12 illustrates an example scenario for determining the absolute orientation of the hand of the user according to an embodiment of the disclosure.

In order to obtain the complete virtual representation of the hand, absolute initial orientation information of the user's hand with respect to the VR device should be determined. Therefore, when the VR device starts in order to determine the absolute orientation of the hand of the user, the user has to place the hand in a stable position for a fixed duration of time. Further, the absolute initial orientation information has to be determined every time the VR device is used by a new user.

The proposed method provides a user interface (UI) that ensures that the user's hand is stable when the VR device is started. Further, the UI can provide virtual buttons that can be clicked by holding the hands stable.

In another embodiment, the other UI elements can be used for providing a pushing/pulling a button sideways and the like.

Figure 13:
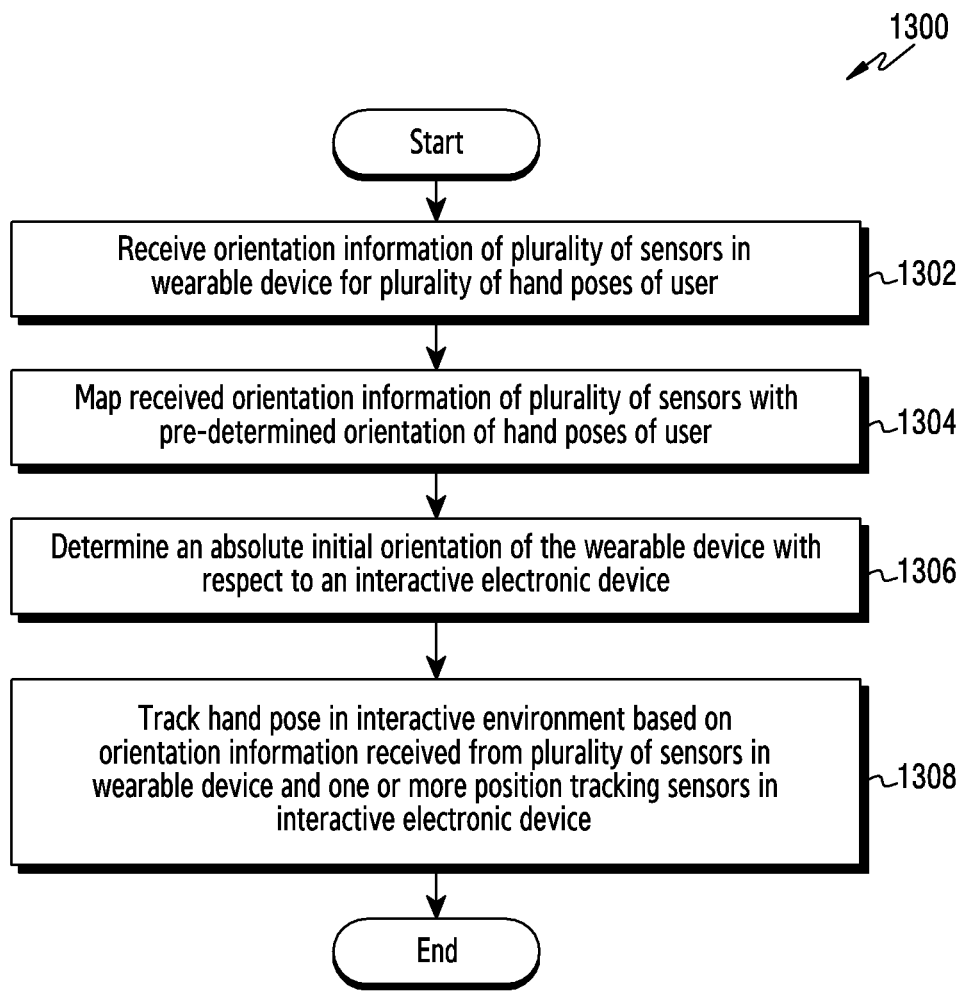
FIG. 13 is a flowchart illustrating a method for hand pose tracking in an interactive environment by the wearable device according to an embodiment of the disclosure.

FIG. 13 is a flowchart 1300 illustrating a method for hand pose tracking in the interactive environment by the wearable device according to an embodiment of the disclosure.

The interactive environment can be for example, the VR environment, an augmented reality (AR) environment, a mixed reality (MR) environment and a gaming environment where the hand poses of the user can be utilized to perform various interactions in the interactive environment.

Referring to the FIG. 13, in operation 1302, the wearable device receives the orientation information of the plurality of sensors for the plurality of hand poses of the user. The position of the various joints in the hand is different for different users. Hence, the position of the sensors in the wearable device is different for different users which provide different orientation to the plurality of sensors according to an embodiment of the disclosure.

In operation 1304, the wearable device maps the received orientation information of the plurality of sensors with the pre-determined orientation of the hand poses of the user.

In operation 1306, the wearable device determines the absolute initial orientation with respect to the interactive electronic device.

In operation 1308, the wearable device dynamically tracks the hand poses in the interactive environment based on the orientation information received from the plurality of sensors and the one or more position tracking sensors in the interactive electronic device.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented using at least one software program running on at least one hardware device and performing network management functions to control the elements.

Various aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include read-only memory (ROM), random-access memory (RAM), compact disc (CD)-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the disclosure can be easily construed by programmers skilled in the art to which the disclosure pertains.

At this point it should be noted that various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include ROM, RAM, CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the disclosure can be easily construed by programmers skilled in the art to which the disclosure pertains.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for virtual reality (VR), the method comprising:
    displaying guide information for requesting a user to position a hand of the user in a predefined space;
    identifying whether the hand of the user is positioned in the predefined space;
    identifying first sensor data including positions and orientations of a plurality of sensors, in case that the hand of the user is positioned in the predefined space, wherein the first sensor data is obtained by the plurality of sensors;
    obtaining at least one image for the hand of the user, in case that the hand of the user is positioned in the predefined space;
    calibrating the plurality of sensors, based on the at least one image and the first sensor data, wherein the calibrating comprises adjusting measurement values of the plurality of sensors;
    identifying second sensor data obtained by the calibrated plurality of sensors; and
    tracking a pose of the hand based on the second sensor data.

2. The method of claim 1, wherein the tracking of the pose of the hand comprises:
    identifying orientation information of the plurality of sensors based on the second sensor data;
    mapping the orientation information with a pre-determined orientation of hand poses of the user;
    determining an initial orientation of a wearable device with respect to a virtual reality (VR) device; and
    tracking the pose of the hand in a VR environment based on the orientation information.

3. The method of claim 2, wherein the determining of the initial orientation of the wearable device with respect to the VR device comprises receiving a relative orientation between a hand of the user with respect to the VR device.

4. The method of claim 2, wherein the plurality of sensors are placed at predetermined locations on the wearable device to track a movement of the hand of the user with respect to the VR device.

5. The method of claim 2, wherein the mapping of the orientation information with the pre-determined orientation of hand poses of the user comprises:
    determining axis of rotation from a first hand pose to a second hand pose using the orientation information received from the plurality of sensors;
    determining a quaternion that minimizes difference between the axis of rotation with an associated virtual axis; and
    mapping the quaternion for each finger for all degrees of movements of the fingers.

6. The method of claim 2, wherein the wearable device comprises one or more position tracking sensors, one or more processors, and the plurality of sensors at pre-determined locations for tracking the pose of the hand in the VR environment.

7. The method of claim 6, wherein, when the hand is outside a field of view with respect to the VR device, the method comprises:
    receiving the orientation information of the plurality of sensors; and
    tracking the pose of the hand in the VR environment based on the orientation information and information from the one or more position tracking sensors.

8. The method of claim 1,
    wherein the displaying the guide information comprises displaying guide information for requesting at least one other pose of the hand of the user or at least one other placement of the hand of the user, and
    wherein the calibrating of the plurality of sensors comprises calibrating the plurality of sensors based on information obtained from the at least one other pose of the hand of the user or the at least one other placement of the hand of the user to respective other guide information.

9. An electronic device comprising:
a display;
a camera;
a transceiver; and
at least one processor electrically coupled with the transceiver, the camera and the display, and configured to:
display guide information through the display for requesting a user to position a hand of the user in a predefined space,
identify whether the hand of the user is positioned in the predefined space,
identify first sensor data including positions and orientations of a plurality of sensors, in case that the hand of the user is positioned in the predefined space, wherein the first sensor data is obtained by the plurality of sensors disposed in a wearable device and is received through the transceiver,
obtain at least one image for the hand of the user through the camera, in case that the hand of the user is positioned in the predefined space,
calibrate the plurality of sensors, based on the at least one image and the first sensor data, wherein the calibrating comprises adjusting measurement values of the plurality of sensors,
identify second sensor data obtained by the calibrated plurality of sensors and received through the transceiver, and
track a pose of the hand based on the second sensor data.

10. The electronic device of claim 9, wherein the at least one processor is, in order to track the pose of the hand, further configured to:
identify orientation information of the plurality of sensors based on the second sensor data;
map the orientation information with a pre-determined orientation of hand poses of the user;
determine an initial orientation of the wearable device with respect to the electronic device; and
track the pose of the hand in a virtual reality (VR) environment based on the orientation information.

11. The electronic device of claim 10, wherein the at least one processor is further configured to receive a relative orientation between the hand of the user with respect to the electronic device.

12. The electronic device of claim 10, wherein the plurality of sensors are placed at predetermined locations on the wearable device to track a movement of the hand of the user with respect to the electronic device.

13. The electronic device of claim 10, wherein the at least one processor is further configured to:
determine axis of rotation from a first hand pose to a second hand pose using the orientation information received from a plurality of sensors;
determine a quaternion that minimizes difference between the axis of rotation with an associated virtual axis; and
map the quaternion for each finger for all degrees of movements of the fingers.

14. The electronic device of claim 10, wherein the wearable device comprises one or more position tracking sensors, one or more processors, and the plurality of sensors at pre-determined locations for tracking the hand pose in the VR environment.

15. The electronic device of claim 14, wherein, when the hand is outside a field of view with respect to the camera of the electronic device, the at least one processor is further configured to:
receive the orientation information of the plurality of sensors; and
track the pose of the hand in the VR environment based on the orientation information and information from the one or more position tracking sensors in the electronic device.

16. The electronic device of claim 9,
wherein the at least one processor is, in order to display the guide information, further configured to display other guide information for requesting at least one other pose of the hand of the user or at least one other placement of the hand of the user, and
wherein the at least one processor is, in order to calibrate the plurality of the sensors, configured to calibrate the plurality of sensors based on information obtained from the at least one other pose of the hand of the user or the at least one other placement of the hand of the user to respective other guide information.

17. The electronic device of claim 9, wherein the adjusting of the measurement values of the plurality of sensors comprises defining rules configured to perform a conversion of measurement values.

18. The electronic device of claim 9, wherein the plurality of sensors comprise sensors in a wearable device worn on the hand of the user.

19. The electronic device of claim 18,
wherein none of the plurality of sensors are positioned on a ring or a pinky finger of the hand of the user, and
wherein a flexion angle of the ring and the pinky fingers of the hand of the user is obtained from a flexion angle of a middle finger of the user.

20. An electronic device comprising:
a display;
a camera;
a transceiver; and
at least one processor electrically coupled with the transceiver, the camera and the display, and configured to:
display guide information through the display for requesting a user to position a hand of the user in a predefined space,
identify whether the hand of the user is positioned in the predefined space,
identify first sensor data including positions and orientations of a plurality of sensors, in case that the hand of the user is positioned in the predefined space, wherein the first sensor data is obtained by the plurality of sensors disposed in a wearable device and is received through the transceiver,
obtain at least one image for the hand of the user through the camera, in case that the hand of the user is positioned in the predefined space,
calibrate the plurality of sensors, based on the at least one image and the first sensor data, wherein the calibrating comprises defining rules configured to perform a conversion of measurement values of the plurality of sensors,
identify second sensor data obtained by the calibrated plurality of sensors and received through the transceiver, and
track a pose of the hand based on the second sensor data.

* * * * *